United States Patent [19]

Sórensen

[11] Patent Number: 4,762,074
[45] Date of Patent: Aug. 9, 1988

[54] PROCESS FOR THE INCINERATION OF COMBUSTIBLE MATERIALS

[75] Inventor: Leif E. Sórensen, Frederiksberg, Denmark

[73] Assignee: The Alpha Foundation, Vaduz, Liechtenstein

[21] Appl. No.: 878,744

[22] Filed: Jun. 26, 1986

[30] Foreign Application Priority Data

Jun. 28, 1985 [LU] Luxembourg .................... 85980

[51] Int. Cl.$^4$ ............................................. F23J 11/00
[52] U.S. Cl. ................................. 110/346; 110/205; 110/208; 110/214; 110/215; 110/245; 110/263; 110/345
[58] Field of Search ............... 110/342, 344, 345, 346, 110/347, 215, 216, 235, 245, 263, 265, 102, 233, 238, 205, 208, 214

[56] References Cited

U.S. PATENT DOCUMENTS

| | | | |
|---|---|---|---|
| 3,926,129 | 12/1975 | Wall | 110/346 X |
| 4,235,174 | 11/1980 | Spurrell | 110/346 |
| 4,329,932 | 5/1982 | Takahashi et al. | 110/347 |
| 4,381,718 | 5/1983 | Carver et al. | 110/342 X |
| 4,411,204 | 10/1983 | Hamilton | 110/347 |
| 4,485,745 | 12/1984 | Bracker et al. | 110/210 X |
| 4,495,874 | 1/1985 | Greskovich et al. | 110/342 X |
| 4,558,652 | 12/1985 | Downs et al. | 110/347 |
| 4,586,895 | 5/1986 | Battles | 110/347 X |
| 4,592,289 | 6/1966 | Pershing et al. | 110/345 |

*Primary Examiner*—Steven E. Warner
*Attorney, Agent, or Firm*—Sughrue, Mion, Zinn, Macpeak and Seas

[57] ABSTRACT

A process and plant for improving the incineration of fuels, in order to reduce the production of noxious gases, particularly nitrogen oxides ($NO_x$) and also to reduce the emission of dioxines and furans when incinerating solid or liquid wastes containing precursors of dioxines and furans. Air containing an excess of oxygen is used for incinerating the combustible materials. The amount of oxygen contained in the enriched air is preferably of about 30 to 35% with respect to the normal content of oxygen (23.19%). The plant comprises essentially at least one combustion chamber and an equipment for supplying air enriched with oxygen to said combustion chamber.

19 Claims, 1 Drawing Sheet

PROCESS FOR THE INCINERATION OF COMBUSTIBLE MATERIALS

PRIOR ART

It is known to incinerate solid fuels such as coal, lignite and many others, including Refuse Derived Fuels (RDF) both in the form of "Solid Waste" and disintegrated Solid Waste, as well as in the more refined form of RDF which consists of the dry fraction of the solid waste.

This incineration can take place on any type of grate, in a rotary kiln or in a fluid bed, all in single or multiple executions, or in combination thereof.

It is also known that the temperature varies very much from place to place in the incineration chamber and that different fuels require different amounts of surplus air in order to obtain a satisfactory incineration in said incineration chamber.

It is also known that the major part of the noxious gases is developed from the nitrogen contained in the air supplied to the incineration chamber as well as that dioxines and furans are developed from their precursors when the temperature in the incineration chamber varies from about 180° C. and up to about 1000°–1200° C. depending on the type of dioxin-isomer which is present.

It is also known that the further the temperature in the combustion zone of an incinerator can be reduced, the less will be the development of noxious gases ($NO_x$), or in other words the lower the temperature in said combustion chamber can be, the less noxious gases will be sent to the atmosphere.

On the other hand, it has been proved that it is necessary to maintain a rather high temperature (around 1200° C.) in the combustion chamber, in order to remove totally dioxines and furans produced from their precursors from the flue gases; this removal requires the supply of great amounts of fresh air to the combustion chamber of the incinerator.

Incineration plants using standard grates will in many cases have problems in obtaining the required temperature in the combustion chamber and will consequently require a second incineration chamber where the temperature can be maintained by the aid of a secondary burner.

Due to the increase in temperature, from the normal temperature (around 600° C.) to the temperature (around 1200° C.) at which the dioxines are reduced, the creation of noxious gases will increase considerably, and this production of noxious gases must be reduced to the amount produced at the normal temperatures.

Incinerators using a combination of a grate followed by a rotary kiln will show exactly the same problems as those mentioned above.

BRIEF DESCRIPTION OF THE INVENTION

An object of this invention is to provide a process for incinerating combustible materials ensuring a reduction of the amount of noxious gases (nitrogen oxides, $NO_x$), and at the same time a reduction of the amounts of fresh air necessary for this incineration, which is still ensuring that there is enough oxygen to reduce all the hydrocarbons as well as dioxines and furans to their more harmless precursors.

The process according to the invention for incinerating said fuels in an incineration plant is characterized in that the air fed to the incineration chamber is enriched in such a way that its oxygen specific content (i.e. is the content of oxygen per unit volume) is increased, either by separating from the feeding air stream a pair of its nitrogen content, or by furnishing to the incineration chamber a mixture of normal air and air highly enriched with oxygen.

The amount of oxygen contained in the enriched air fed to the combustion chamber or to the incineration chamber is preferably comprised between about 30% to about 35% with respect to the normal oxygen content of the air (23.19% by weight). For producing enriched air, it is possible to use one of the well known types of processes, such as Pressure Swing Absorption (PSA), Vacuum Swing Absorption (VSA) or a cryogenic plant or one of other suitable processes.

Using during the whole process gaseous oxygen for the enriched air avoids the onerous liquefaction of oxygen and offers economical advantages.

It is also possible of course, but less economical, to use either technical oxygen from pipeline supplies or liquid oxygen delivered from outside supplies by tank.

In the case where, according to a preferred embodiment of the invention, the incineration takes place in two steps comprising a first step of gasification with pyrolysis and a second step of incinerating the produced gas, air enriched with oxygen is used in the second step in order to keep the creation of noxious gases low and at the same time help the reduction of dioxines due to the high temperature and the oxygen rich atmosphere.

This method is very reliable when carried out in a plant comprising a bed pyrolyzer using a high flow of recirculated flue gas (an oxygen poor atmosphere) and having either a standard incineration chamber where enriched air is added or a circulating bed from which gases are separated in a cyclone connected to a second chamber or afterburner chamber in which the gases produced in the fluid bed pyrolyzer are ignited and burnt in an atmosphere of air enriched with oxygen.

The advantage of the combination pyrolyzer-afterburner is that the pyrolyzing temperature can be kept so low (around 600–800 C.) that ash-melting problems are greatly reduced, and when using a fluid bed in the pyrolyzer, a very high degree of heat recovery is obtained, due to the fact that the combustible material is totally burnt out before leaving the fluid bed.

Experience has shown that such a fluid bed-pyrolyzer can be regulated from about 40% load up to full load.

In the combustion zone or second chamber after the cyclone, the amount of air enriched with oxygen introduced into the combustion chamber is regulated for continuous operation at 1200° C. with surplus oxygen, said second chamber being big enough to fulfil specifications.

As a result of the above measures, the flue gases leaving the incinerator will have a noxious gas content equal to or below that normally obtained when incinerating solid fuels (e.g. RDF) at 700°–800° C., and at the same time the dioxines and furans created during the incineration will be reduced to nearby nothing, thanks to the high temperature, the oxygen rich atmosphere, the turbulence and the retention time.

The combustion system is followed by a particle removing system, comprising for example, cyclones, multicyclones, electrostatic precipitators (filters), or other types of particle removing equipments, in order to remove solid particles and heavy metals (except mercury, which in its vapor form cannot be trapped in this way).

The particle filter is followed by a heat exchanger to recover the surplus heat from the flue gases, and finally the flue gases pass a scrubber in order to remove sulphur oxides ($SO_X$), chlorides (Cl), fluorinated compounds (such as HF), and mercury.

After a demistor, the cleaned flue gases are sent to the stack by an induced draught fan, with or without reheating the gases.

All this particle removal, heat exchanger, and flue gas scrubbing equipment does not form part of the present invention, but is necessary to obtain a flue gas acceptable to nature and with very low contents of pollutants.

BRIEF DESCRIPTION OF THE DRAWINGS

The attached drawings illustrate a few embodiments of the process and plant according to this invention.

In these drawings.

DETAILED DESCRIPTION OF THE INVENTION

Figure 1:
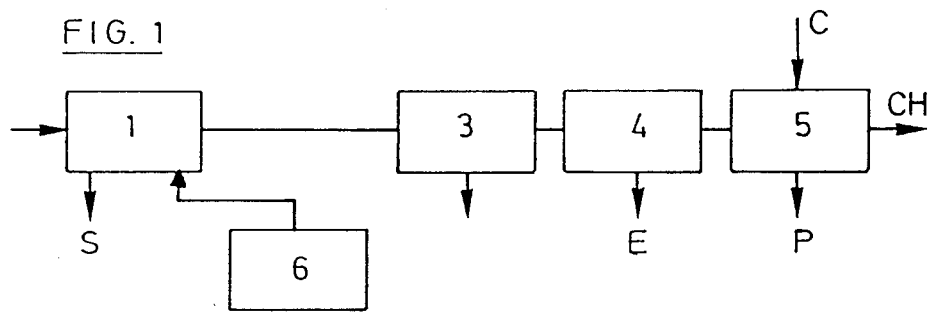
FIGS. 1 to 4 are block diagrams of plants in which the process according to this invention can be carried out. In these figures, the same references are used for designating identical or similar devices.

In FIG. 1, reference 1 represents a combustion chamber or incinerator, in which a solid combustible material, such as waste materials or any type of fuel, is introduced.

The slags formed in combustion chamber 1 are removed therefrom. The combustion chamber 1 is supplied with air enriched with oxygen from a unit 6 which may contain an air separator for supplying the necessary amount of technical oxygen in gas form as well as a mixer in which this technical oxygen is mixed with a certain quantity of fresh air, the obtained mixture of air and technical oxygen being sent to the incinerator 1.

In cases where the calorific value of the combustible material is so low that it is not possible to obtain the specified temperature, a better fuel such as coal can be added (by means not represented) to the feed to the combustion chamber, or an oil- or gasburner can be installed with automatic start up for maintaining said temperature.

The supply of the combustion chamber 1 with air enriched with oxygen increases the temperature to a value which causes a reduction of the formation of noxious nitrogen containing gases and a conversion of dioxines, furans and other poisonous products to their harmlesss precursors.

The incinerator 1 may be any type of incinerating furnace, such as a grate furnace, a rotary kiln or a furance with a fluidized bed.

Solid particles contained in the gaseous effluent of the incinerator 1 are separated therefrom in a particle separator 3, which may be a cyclone, a multicyclone, an electrostatic precipitator, a bag house of the like.

The cleaned gases are then cooled in a cooler 4 which may be a heat exchanger of a known type, which transfers the heat to an energy consuming system, such as a central heating equipment.

The outgoing gas is then optionally treated with chemical reagents in the so-called "polishing" equipment 5, in which pollutants such as sulfur dioxide, chlorine, fluorine, heavy metals, such as mercury etc . . . are separated therefrom. The flue gases can then be sent to a stack.

Figure 2:
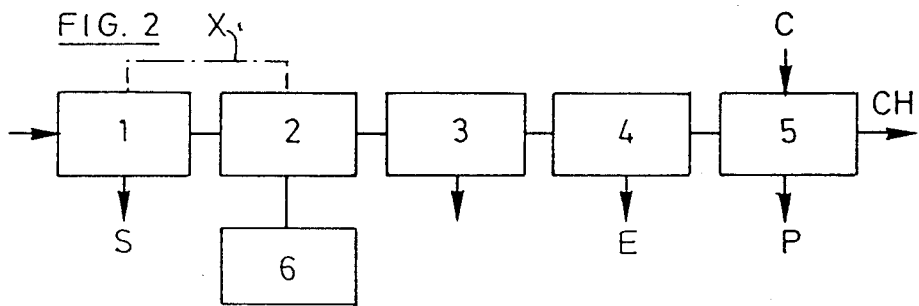

The plant shown in FIG. 2 is identical to that of FIG. 1, except that the incineration is carried out in two units, i.e. a gasification unit 1, in which the combustible material is pyrolyzed into a hydrocarbon-containing gas which is then burnt in a combustion chamber 2 supplied with oxygen enriched air.

The pyrolysis in the gasification chamber 1 can be improved by recycling part of the combustion gases obtained in the combustion chamber 1, as shown by X.

Figure 3:
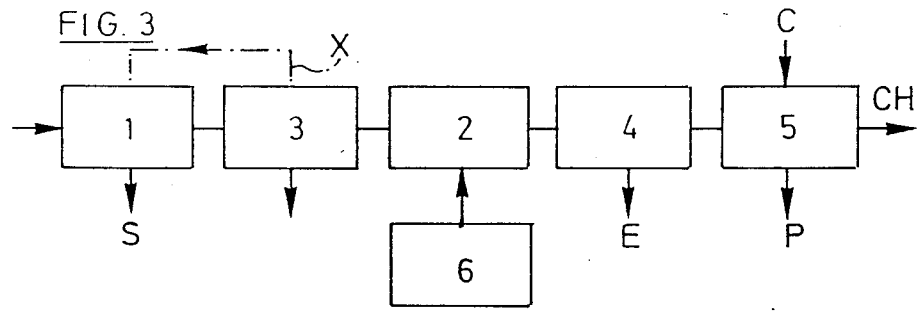

The plant shown in FIG. 3 is identical to that of FIG. 2, except that the particle separator 3 is inserted between the gasification chamber 1 and the combustion chamber 2. In this case, part of the gases formed by pyrolysis of the combustible material in the gasification chamber 1 may be recycled into this chamber 1.

Figure 4:
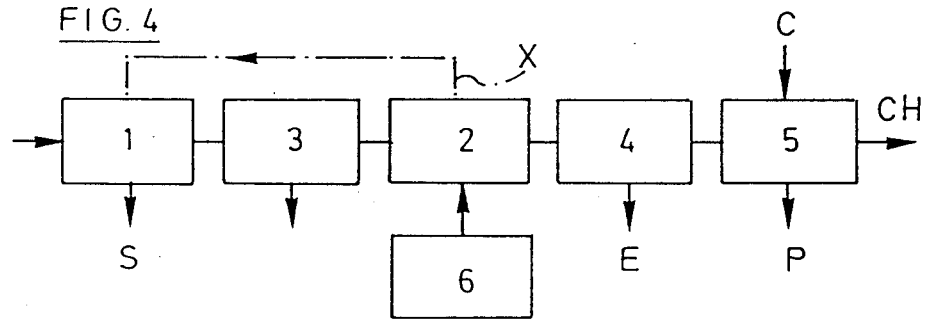

Finally, the plant shown in FIG. 4 is similar to that shown in FIG. 3, except that a predetermined fraction of the gases which have been produced in the gasification unit 1, cleaned in the dust separator 3 and burnt with air enriched with oxygen in the combustion equipment 2 is recycled into said gasification unit 1, as shown by X.

In a plant according to the invention, it is now possible to burn materials, containing the precursors of dioxines, furans and other toxic materials and obtain the high temperatures necessary for the destruction of said poisonous materials, and at the same time to obtain high temmperatures due to the fact that an oxygen enriched air is used in the combustion chamber, no additional fuel being normally necessary to ensure the high temperatures required for the destruction of the poisonous materials.

This is obtained due to the fact that the enriched air contains more oxygen and consequently less nitrogen, so that there is less inactive gas to be heated during the combustion, and higher temperatures can be reached, without adding extra fuel.

A further advantage is obtained by using air enriched with oxygen, because the amount of noxious gases produced during an incineration will normally increase by increased temperature, but in this case where the nitrogen content of the air supply has been reduced due to the higher oxygen content of the enriched air, the formation of noxious gases, due to the presence of nitrogen in the supply is reduced accordingly, and this allows the use of the necessary higher temperatures without an increase in the formation of noxious gases.

The process according to the invention mainly aims at the incineration of waste materials which contain the precursors of poisonous materials such as dioxines, furans and others, where a few hundred centigrades higher temperature than is normal will destroy the poisonous materials, without increasing the formation of noxious gases.

The same process can of course be utilized for the combustion of other solid or liquid fuels, where the use of air enriched with oxygen reduces the amount of nitrogen present, and where the increase in temperature is avoided by recycling part of the low-temperature flue gas to cut down the temperature.

A comparison of three systems of incineration will be found hereinafter for indicating by the aid of numerical values the advantages of the invention.

Part II relates to the conventional process of incineration. Part I relates to a process of incineration using a post-combustion chamber for obtaining a final temperature of 1200° C. Part III relates to the process according to the invention, using oxygen enriched air, but still calculating on basis of the commonly used 100% surplus air.

It will be noticed that the necessary amount of air used per kilo fuel is reduced to about 4.10 kilos or only 49% of the amount when using afterburner, and the nitrogen content is reduced to about 43%.

Part IV relates to the process according to the invention using oxygen-enriched air, but now calculating with full scale test-results showing that only 15% surplus air is necessary.

Here it will be noticed that even if 15% surplus air is enough for the combustion, the demand for 6% oxygen in the flue gases in order to destroy dioxines and furans will necessitate the use of 23% surplus air with 32% oxygen, the flue gases will be reduced to only 30% of the original value and the nitrogen content to about 27%—a considerable advantage.

| TEST TECHNOLOGY: | I | II | III | IV |
|---|---|---|---|---|
| WASTE DATA: | | | | |
| Calorific value KCal/kg | 1808 | 1808 | 1808 | 1808 |
| Carbon kg/kg | 0.2100 | 0.2100 | 0.2100 | 0.2100 |
| Hydrogen kg/kg | 0.0350 | 0.0350 | 0.0350 | 0.0350 |
| Nitrogen kg/kg | 0.0050 | 0.0050 | 0.0050 | 0.0050 |
| Sulphur kg/kg | 0.0009 | 0.0009 | 0.0009 | 0.0009 |
| Oxygen kg/kg | 0.1900 | 0.1900 | 0.1900 | 0.1900 |
| Water kg/kg | 0.3500 | 0.3500 | 0.3500 | 0.3500 |
| INCINERATION DATA: | | | | |
| Surplus air % | 100 | 100 | 100 | 23 |
| Oxygen in air % W | 0.2319 | 0.2319 | 0.3200 | 0.3200 |
| Stoichiometric amount of air kg/kg | 2.81 | 2.81 | 2.05 | 2.05 |
| Amount of nitrogen kg/kg | 5.63 | 5.63 | 4.10 | 2.50 |
| Air pressure, total, Bar | 1.013 | 1.013 | 1.013 | 1.013 |
| Amount of air, reduced % | 100 | 100 | 72.8 | 44.0 |
| Amount of nitrogen kg/kg | 4.249 | 4.249 | 2.7394 | 1.698 |
| Adiabatic temperature °C. | | 950 | 1200 | 1200 |
| Afterburner temperature °C. | 1200 | | 1200 | 1200 |
| POSTCOMBUSTION AND ENRICHED AIR DATA: | | | | |
| Additional air amount kg/kg | 2.81 | | 0 | 0 |
| Total air kg/kg | 8.43 | | 4.10 | 2.50 |
| Amount of oil kg/kg | 0.307 | | 0 | 0 |
| Price of oil u/kg | 1.30 | | | |
| Additional oxygen kg/kg | | | 0.3594 | 0.2218 |
| Price of oxygen u/kg | | | 1.00 | 1.00 |
| Additional price u/kg | 0.40 | | 0.36 | 0.22 |
| FLUE GASES: | | | | |
| Flue gas, total amount kg/kg | 9.54 | | 4.89 | 2.50 |
| Nitrogen, total amount kg/kg | 6.3747 | | 2.7444 | 1.6984 |

Comments and conclusions

Generally speaking, the composition of the combustible consisting in solid refuses is based on the analysis made in numerous plants in several countries.

Technology I relates to the use of a post-combustion chamber in which the temperature is raised from the present level of 750°-950° C. to 1200° C. during at least 2 seconds, under specified conditions.

Additional heat must be furnished in order to maintain the temperature of 1200° C. under all conditions. Oil or gas burners are provided to this end.

The results are based on the level of temperature above 950° C. and due to the oxygen content in the flue gases being about 6-8%, the post-combustion will need an additional amount of air in order to secure the good function of the oil or gas burners.

Technologies III and IV (i.e. the invention) use oxygen enriched air, and no additional combustible is needed for attaining the temperature of 1200° C. The higher content of oxygen in the air fed to the incinerator will alone increase the temperature because the heat produced during the combustion will be used for heating a very smaller amount of air (since its content of oxygen will be higher) and the temperature will be higher than in the case of a normal incineration with ordinary air.

For securing a temperature of 1200° C. the needed content of oxygen in the air will be 32% instead of the normal content of 23.19%.

These additional 8.81% oxygen or 0.3594 oxygen per kilo of waste can be either brought as liquid oxygen or produced locally by one of the processes listed above. The costs are calculated for the case of the most onerous solution, i.e. when oxygen is supplied from the exterior. A local production of oxygen will in most cases be considerably less expensive, e.g. between 30-45% of the above-mentioned price.

The price of liquid oxygen with 99.9% oxygen has been fixed to a fictitious monetary unit for enabling to compare several different costs.

All calculations are strictly stoichiometric and consequently without the losses normally observed in actual operation, but it has been observed that the losses are bigger when air is used in bigger amounts.

It will still be noted that the equipment comprising the boiler, the heat exchanger, the scrubbers, the fans, the stack and so on will be considerably less expensive when use is made of enriched air, because the amount of air used is only 4.10 kg/kg in the process III while it is 8.43 kg/kg in the process I, respectively 2.5 kg/kg in process IV. The reductions in amount of flue gas is 50% and 70% respectively.

The combustible material mentioned above may be a solid fuel selected from among coal, lignite, peat, wood-chips, solid waste and refuse-derived fuels, or mixtures of these. Furthermore, the above-mentioned fluid bed which is located in the combustion chamber and in which the combustible material is burnt may be a fluidized bed, such as a bubbling or a circulating fluidized bed.

What I claim is:

1. A process for incinerating solid waste combustible materials containing precursors of poisonous dioxines and furans, in which said combustible materials are completely combusted by means of air to which an amount of oxygen has been added so as to obtain air containing an excess of oxygen of about 30 to 35% by weight with respect to its normal oxygen content (23.19%), said amount of oxygen being sufficient for obtaining combustion gases at a temperature of at least 1200° C., and said excess of oxygen being such that the hot combustion gases contain enough oxygen for destroying the poisonous dioxines and furans, whereby the noxious nitrogenous gases are cut down and the poisonous dioxines and furans are destroyed.

2. A process according to claim 1 wherein said solid waste combustible materials are selected from among lignite, peat, wood-chips, solid waste and refuse-derived fuels or mixtures thereof.

3. A process according to 1, characterized in that it comprises the two steps of (1) pyrolyzing the combustible material at a relatively low temperature and of (2) incinerating the gases produced in step (1) at a temperature of at least 1200° C. by means of air enriched with oxygen.

4. A process according to claim 3, in which the combustible material is first pyrolyzed at a temperature of about 600° C. to 850° C. and the gases produced in step (1) are then incinerated at a high temperature of about 1200 C. by means of air enriched with oxygen.

5. A process according to claim 4, characterized in that a fraction of the flue gas is recycled in step (1) after incineration by means of air enriched with oxygen.

6. A process according to claim 5, characterized in that the fraction of hot flue gas is recycled in step (1) after separation of solid particles contained in said gas.

7. A process according to claim 3, characterized in that a fraction of hot flue gas is recycled in step (1) prior to incineration.

8. A process according to claim 7, characterized in that the fraction of hot flue gas is recycled in step (1) after separation of solid particles contained in said gas.

9. A plant for incinerating solid waste combustible materials containing precursors of poisonous dioxines and furans, said plant comprising: at least one combustion chamber; means for supplying to said combustion chamber a stream of air; and means for introducing into the stream an amount of oxygen sufficient to obtain air containing an excess of oxygen of about 30 to 35% by weight with respect to its normal oxygen content (23.19%), said amount of oxygen being sufficient for obtaining combustion gases at a temperature of at least 1200° C., and said excess of oxygen being such that the hot combustion gases contain enough oxygen for destroying the poisonous dioxines and furans, whereby the noxious nitrogenous gases are cut down and the poisonous dioxines and furans are destroyed.

10. A plant according to claim 9 wherein said solid waste combustible materials are selected from among lignite, peat, wood-chips, solid waste and refuse-derived fuels or mixtures thereof.

11. A plant according to claim 9, characterized in that the combustible material is burnt in a fluidized bed, such as a bubbling or a circulating fluidized bed, in the combustion chamber.

12. A plant according to claim 9, characterized in that a separator of solid particles is provided after the chamber into which air enriched with oxygen is supplied.

13. A plant according to claim 9, characterized in that it comprises a heat exchanger for recuperating the heat developed during the pyrolysis and/or the incineration.

14. A plant according to claim 9, characterized in that it comprises a scrubber for treating the flue gas before sending it into the atmosphere.

15. A plant according to claim 9, characterized in that it comprises means for reheating the flue gases before sending them into the atmosphere.

16. A plant according to claim 9, characterized in that it comprises two combustion chambers, i.e. a first combustion chamber for pyrolyzing the combustible material and a second combustion chamber for incinerating the gas produced in the first chamber by means of air enriched with oxygen supplied by said equipment.

17. A plant according to claim 16, characterized in that a separator of solid particles is inserted between the pyrolysis chamber and the combustion chamber in which air enriched with oxygen is supplied.

18. A plant according to claim 16, characterized in that means are provided for maintaining a temperature of about 600°–850° C. in the pyrolysis chamber and means are provided for maintaining a temperature of at least 1200° C. in the incinerating chamber.

19. A plant according to claim 16 or 18, characterized in that means are provided for recycling into the pyrolysis chamber a fraction of the gas produced in the incinerating chamber.

* * * * *